(12) United States Patent
Kashimoto

(10) Patent No.: US 6,337,002 B1
(45) Date of Patent: Jan. 8, 2002

(54) ALKALINE IONIC WATER CONDITIONER

(75) Inventor: Masahiko Kashimoto, Munakata (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 0 days.

(21) Appl. No.: 09/560,149

(22) Filed: Apr. 28, 2000

(30) Foreign Application Priority Data

May 10, 1999 (JP) ............................................. 11-128214

(51) Int. Cl.[7] .............................. B23H 3/02; B23H 7/04; B23H 7/14; C25B 9/00
(52) U.S. Cl. ................................ 204/228.6; 204/229.8; 204/230.2; 204/230.5
(58) Field of Search ........................... 204/228.1, 228.6, 204/229.8, 230.2, 230.5, 230.8

(56) References Cited

U.S. PATENT DOCUMENTS 6,200,434 B1 * 3/2001 Shinjo et al. ............. 204/230.2

FOREIGN PATENT DOCUMENTS

| JP | 8323362 | 12/1996 |
|---|---|---|
| JP | 10309580 | 11/1998 |

* cited by examiner

Primary Examiner—Kathryn Gorgos
Assistant Examiner—Wesley A. Nicolas
(74) Attorney, Agent, or Firm—Stevens, Davis, Miller & Mosher, LLP

(57) ABSTRACT

In the present invention, by making an alkaline ionic water conditioner in which an electrolysis current detection device has a plurality of output means different in conversion level, and conversion levels are switched in accordance with the level of a current flowing in an electrolyte, and which has an optimum pH control function by performing duty control, in case of electrifying certain raw water, or in case of adding brine for strongly accelerating generation, when a current flowing between electrode plates is high, the conversion level of the electrolysis current detection device is lowered to generate electrolyte water of pH 10 or more. When the current is low, an electrolysis current detection range with a high resolution can be obtained by raising the conversion level, proper pH control can be performed in accordance with change in electrolysis current in the quality of raw water and adding brine.

6 Claims, 5 Drawing Sheets

ALKALINE IONIC WATER CONDITIONER

BACKGROUND OF THE INVENTION (i) Field of the Invention

The present invention relates to alkaline ionic water conditioners for making alkaline ionic water for drinking or medical use, lotion, or acid ionic water such as germicidal wash water, by electrifying raw water such as service water.

(ii) Description of the Related Art

In recent years, alkaline ionic water conditioners have spread as continuous electrolysis type ion generators. In such alkaline ionic water conditioners, service water or the like is electrolyte in an electrolyte to generate acid ionic water on the anode side and alkaline ionic water on the cathode side.

A conventional alkaline ionic water conditioner of continuous electrolysis type will be described below. FIG. 4 shows a schematic construction of the conventional alkaline ionic water conditioner. As shown in FIG. 4, this alkaline ionic water conditioner comprises, as its components, a raw water pipe 1 for service water or the like; a water faucet 2; an alkaline ionic water conditioner body 3 connected to the raw water pipe 1 via the water faucet 2; a water purifying section 4 provided therein with, e.g., activated charcoal for absorbing remaining chlorine, trihalo methane, mustiness, etc., in raw water, and hollow fibers for accurately removing bacteria and impurities; a flow rate sensor 5 for checking water flowing, and instructing control means to control; a calcium supplying section 6 for adding calcium ions such as calcium glycerophosphate or calcium lactate into raw water to increase the electrical conductivity of the raw water; an electrolyte 7 for electrifying water that has come via the flow rate sensor 5, to generate alkaline ionic water and acid-ionic water; a diaphragm 8 dividing the electrolyte 7 into two parts to form electrode chambers; electrode plates 9 and 10 disposed in the respective electrode chambers formed by dividing the electrolyte 7 in two with the diaphragm 8; a drain pipe 11 for discharging water on the electrode plate 10 side (acid ionic water when the electrode plate 10 operates as an anode); a flow rate regulation section 12 provided near the joint between the electrolyte 7 and the drain pipe 11 for regulating the flow rate of discharged water for efficiently generating alkaline ionic water; a discharge pipe 13 for discharging water on the electrode plate 9 side (alkaline ionic water when the electrode plate 9 operates as a cathode); an electromagnetic valve 14 for discharging resident water in the electrolyte 7 or wash water in which scale consisting of calcium, magnesium, etc., were dissolved while cleaning the electrode plates; a release pipe 15 for discharging the water on the electrode plate 10 side (acid ionic water when the electrode plate 10 operates as an anode), the resident water in the electrolyte 7, and the wash water, via the drain pipe 11; a water purifying section detection sensor 16 for detecting the presence/absence of the water purifying section 4; a power supply plug 17; a power supply section 18 for converting AC power supplied through the power supply plug 17, into DC power; control means 19 for controlling operations of the alkaline ionic water conditioner body 3; an operation display section 20 for displaying operation states of the alkaline ionic water conditioner body 3; an electromagnetic valve 21 that is shut in a water purification mode to stop discharging water, and opened to discharge water when generating alkaline ionic water and acid ionic water; and an electrolysis current detection section 22 for detecting a current quantity flowing between the electrode plates 9 and 10 when generating alkaline ionic water and acid ionic water.

In such a conventional alkaline ionic water conditioner, a current flowing between the electrode plates of the electrolyte is detected, and the supply time of the DC voltage supplied between the electrode plates of the electrolyte is controlled within a fixed period such that the current does not exceed a set current value, that is, the so-called duty is changed to control electrolysis. Besides, the pH value generated varies in accordance with the current quantity flowing between the electrode plates of the electrolyte. In case of generating electrolytic water of pH 9.5 or less, which is generally said to be good to drink, it is generated with a small current value. For example, control in pH 9.5 or less at intervals of 0.5 in pH requires a detection resolution of the electrolysis current in the degree of 0.1 A. Besides, in case of generating electrolytic water of pH 10 or more, which is generally said to be strongly electrolytic water, a large current must be let to flow. For this reason, e.g., in case of raw water with a very high conductivity or adding brine for strongly accelerating generation, a very large current flows. Therefore, if the detection range of the current detection circuit is expanded, the resolution becomes low. In case of generating electrolytic water of pH 9.5 or less, it becomes difficult to control electrolysis at small intervals. If the detection range is narrowed, there is the problem that it becomes hard to cope with raw water with a very high conductivity.

SUMMARY OF THE INVENTION

In order to solve such problems, the present invention is to provide an alkaline ionic water conditioner with safety and high reliability that can perform proper pH control in accordance with the quality of raw water and change in electrolysis current in adding brine.

That is, the present invention is an alkaline ionic water conditioner in which an electrolysis current detection device has a plurality of output means different in conversion level, and conversion levels are switched in accordance with the level of a current flowing in an electrolyte, and which has an optimum pH control function by performing duty control.

According to this invention, in case of electrifying certain raw water, or in case of adding brine for strongly accelerating generation, when a current flowing between electrode plates is high, the conversion level of the electrolysis current detection device is lowered to generate electrolyte water of pH 10 or more. When the current is low, an electrolysis current detection range with a high resolution can be obtained by raising the conversion level, a control in pH 9.5 or less at intervals of 0.5 in pH can be performed, and an alkaline ionic water conditioner with safety and high reliability can be realized.

DETAILED DESCRIPTION OF THE PREFERRED EMBODIMENTS

Hereinafter, embodiments of the present invention will be described with reference to drawings.

Figure 1:
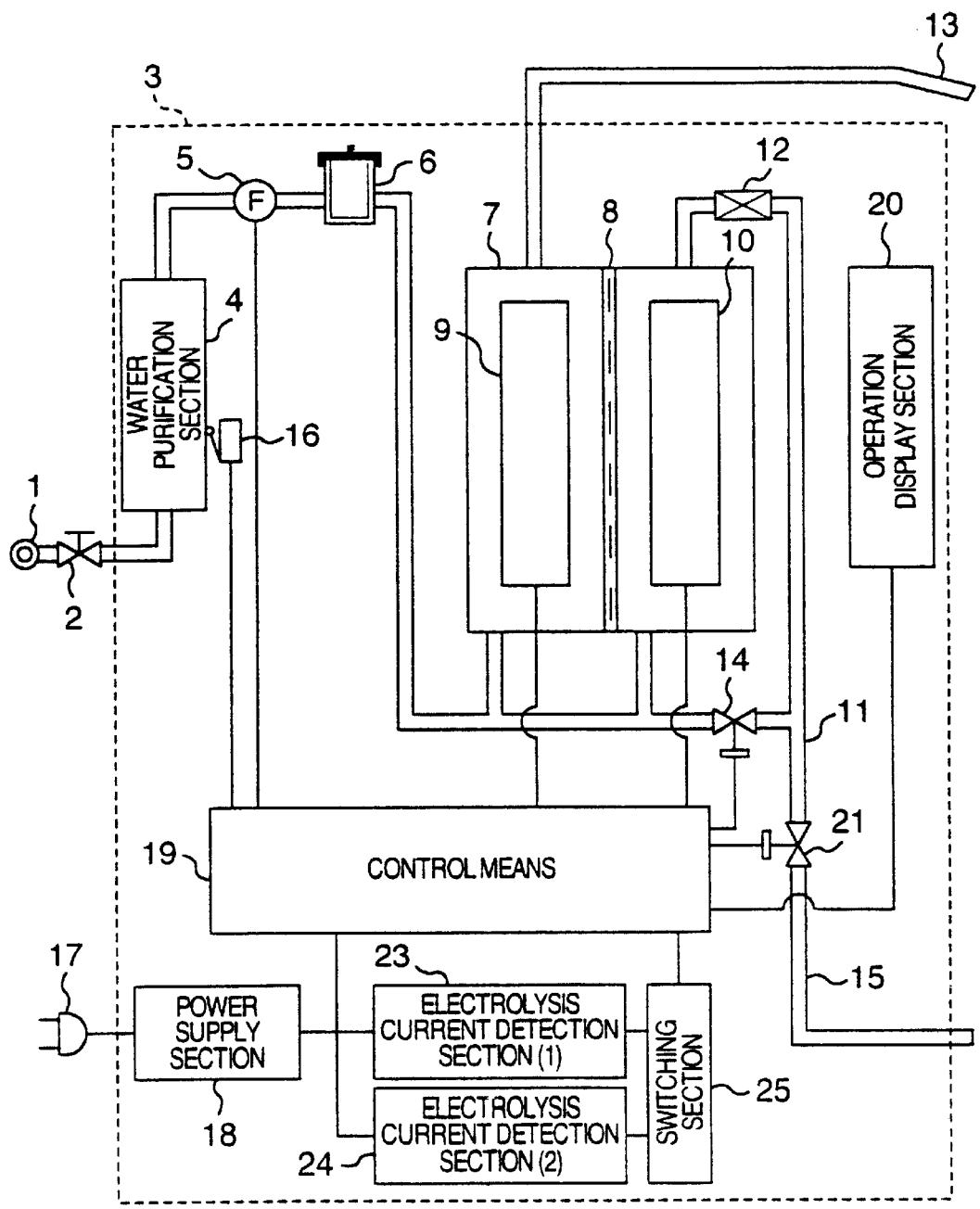
FIG. 1 is a diagrammatic view showing a schematic construction of an alkaline ionic water conditioner according to the present invention.
Figure 2:
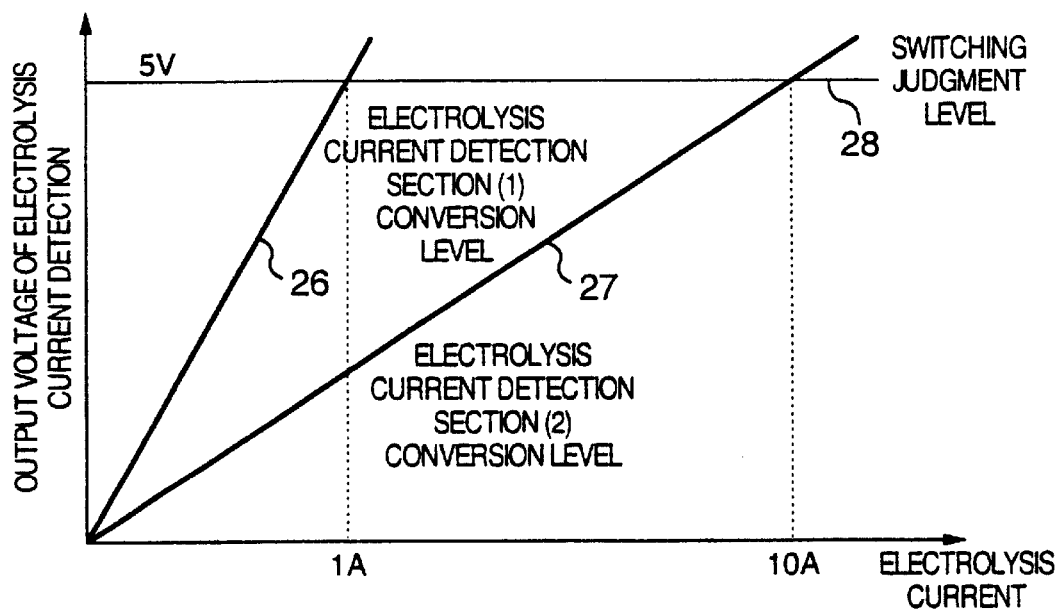
FIG. 2 is a graph for explaining conversion levels of an electrolysis current detection section.
Figure 3:
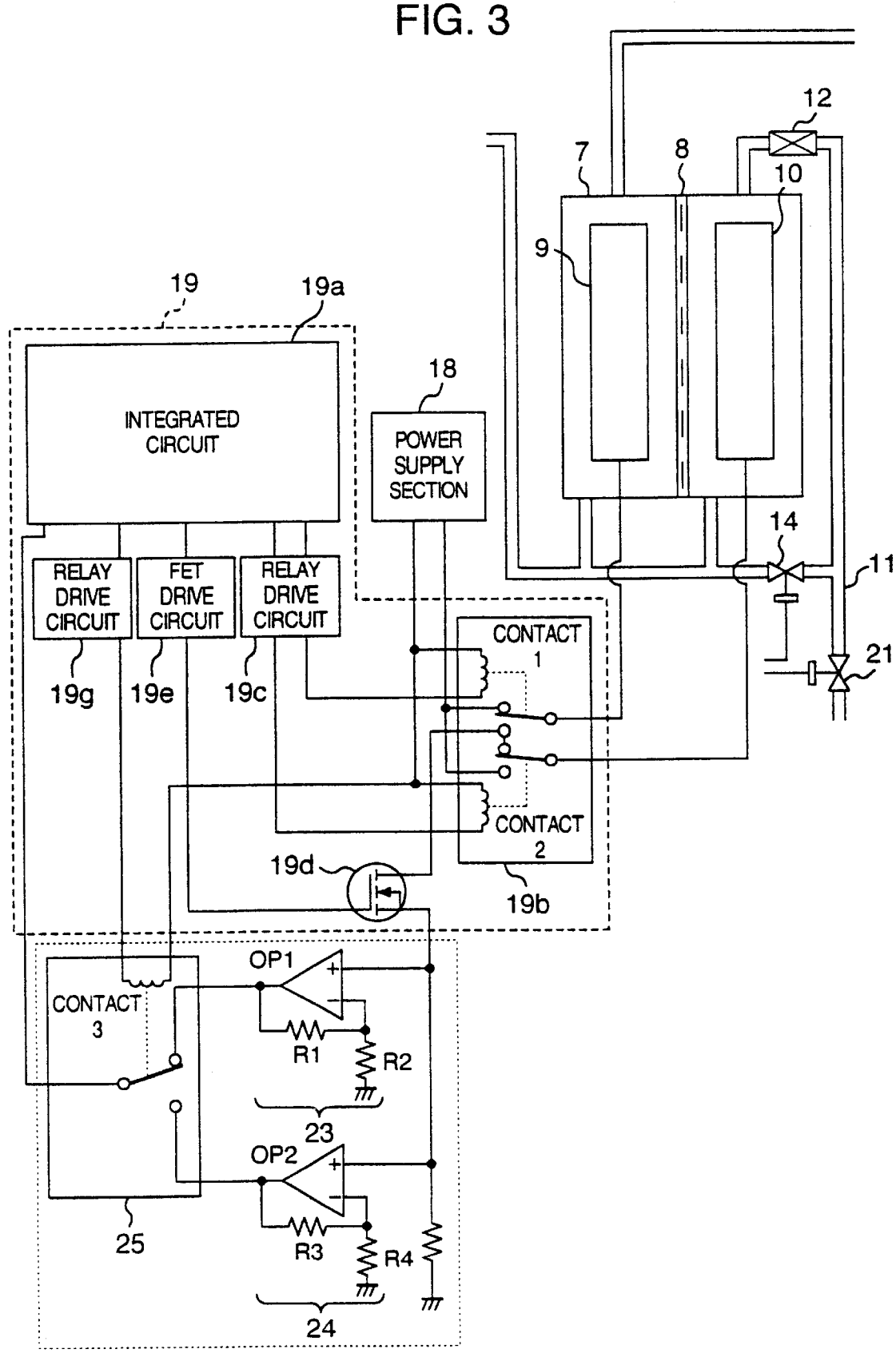
FIG. 3 is a schematic circuit diagram of the electrolysis current detection section.
Figure 4:
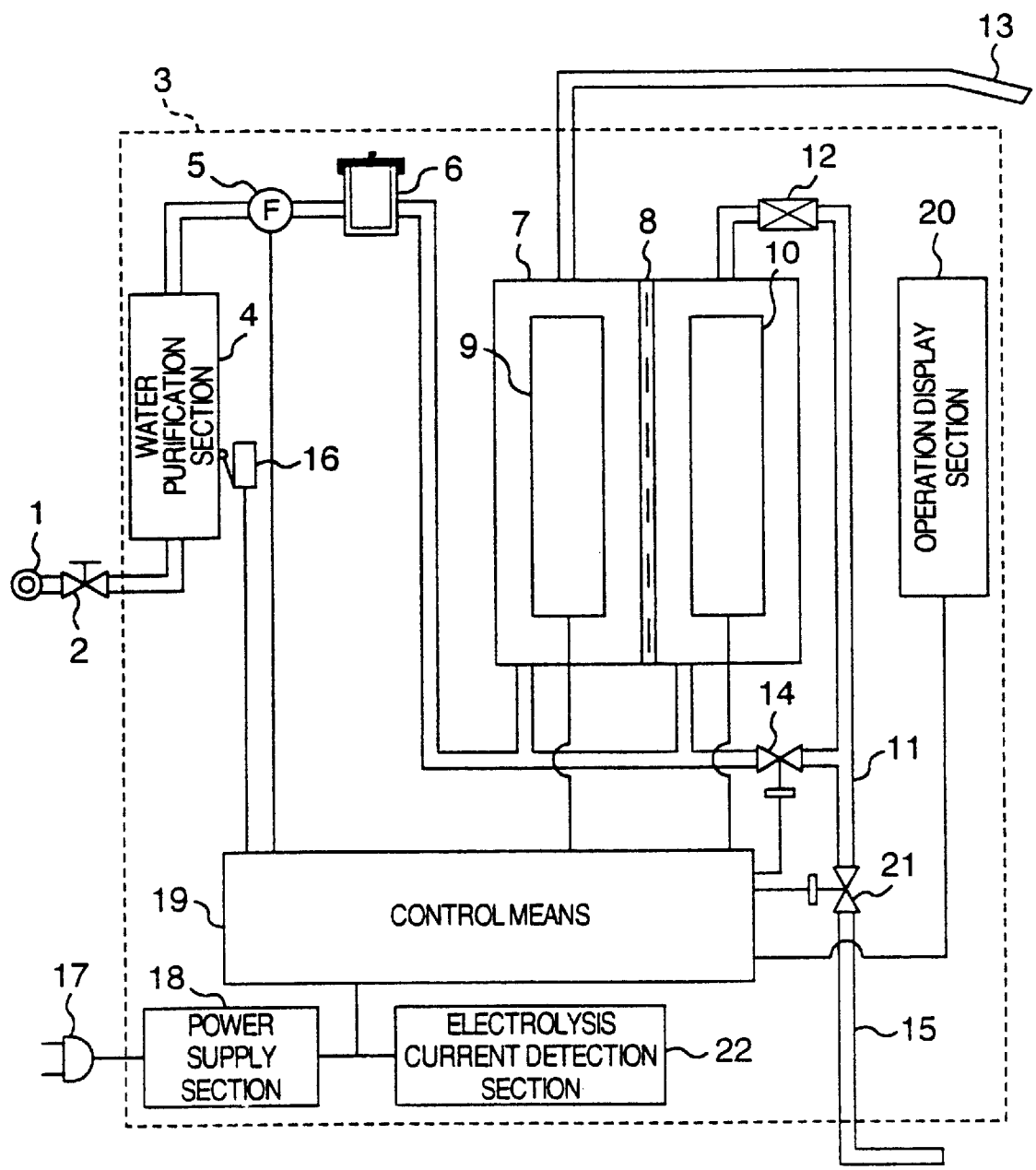
FIG. 4 is a diagrammatic view showing a schematic construction of a conventional alkaline ionic water conditioner.

FIG. 1 is a diagrammatic view showing a schematic construction of an alkaline ionic water conditioner according to the present invention. FIG. 2 is a graph for explaining conversion levels of an electrolysis current detection section. FIG. 3 is a schematic circuit diagram of the electrolysis current detection section.

Referring to FIG. 1, the alkaline ionic water conditioner comprises a raw water pipe 1 for service water or the like; a water faucet 2; an alkaline ionic water conditioner body 3 connected to the raw water pipe 1 via the water faucet 2; a water purifying section 4 provided therein with, e.g., activated charcoal for absorbing remaining chlorine, trihalo methane, mustiness, etc., in raw water, and hollow fibers for accurately removing bacteria and impurities; a flow rate sensor 5 for checking water flowing, and instructing control means to control; a calcium supplying section 6 for adding calcium ions such as calcium glycerophosphate or calcium lactate into raw water to increase the electrical conductivity of the raw water; an electrolyte 7 for electrifying water that has come via the flow rate sensor 5, to generate alkaline ionic water and acid ionic water; a diaphragm 8 dividing the electrolyte 7 into two parts to form electrode chambers; electrode plates 9 and 10 disposed in the respective electrode chambers formed by dividing the electrolyte 7 in two with the diaphragm 8; a drain pipe 11 for discharging water on the electrode plate 10 side (acid ionic water when the electrode plate 10 operates as an anode); a flow rate regulation section 12 provided near the joint between the electrolyte 7 and the drain pipe 11 for regulating the flow rate of discharged water for efficiently generating alkaline ionic water; a discharge pipe 13 for discharging water on the electrode plate 9 side (alkaline ionic water when the electrode plate 9 operates as a cathode); an electromagnetic valve 14 for discharging resident water in the electrolyte 7 or wash water in which scale consisting of calcium, magnesium, etc., were dissolved while cleaning the electrode plates; a release pipe 15 for discharging the water on the electrode plate 10 side (acid ionic water when the electrode plate 10 operates as an anode), the resident water in the electrolyte 7, and the wash water, via the drain pipe 11; a water purifying section detection sensor 16 for detecting the presence/absence of the water purifying section 4; a power supply plug 17; a power supply section 18 for converting AC power supplied through the power supply plug 17, into DC power; control means 19 for controlling operations of the alkaline ionic water conditioner body 3; an operation display section 20 for displaying operation states of the alkaline ionic water conditioner body 3; an electromagnetic valve 21 that is shut in a water purification mode to stop discharging water, and opened to discharge water when generating alkaline ionic water and acid ionic water; an electrolysis current detection section (1) 23 having one of output levels different in conversion level for detecting a current quantity flowing between the electrode plates 9 and 10 when generating alkaline ionic water and acid ionic water; an electrolysis current detection section (2) 24 having a difference in conversion level from the electrolysis current detection section (1) 23; and a switching section 25 for switching between the electrolysis current detection sections (1) 23 and (2) 24.

Operations of the alkaline ionic water conditioner, which is made up from the above components, when alkaline ionic water is generated, will be described next.

A user presses a mode selection button in the operation display section 20 to select and set an alkaline ionic water generation mode, an acid ionic water generation mode, or a water purification mode. In the alkaline ionic water generation mode or the acid ionic water generation mode, the user further selects a desired pH intensity with a pH intensity button in the operation display section 20, and then opens the water faucet 2. Raw water supplied through the water faucet 2 is treated in the water purifying section 4 to remove therefrom impurities such as remaining chlorine, trihalo methane, mustiness, and bacteria in the raw water. After flowing through the flow rate sensor 5, the raw water is treated in the calcium supplying section 6 to dissolve therein calcium glycerophosphate, calcium lactate, or the like. The raw water is thereby conditioned into water easy to electrolyze, and then let to flow into the electrolyte 7.

On the other hand, a power of AC 100 V is supplied through the power supply plug 17, and a DC power necessary for electrolysis is generated by a transformer and a DC power supply for control in the power supply section 18. The power necessary for electrolysis is then supplied to the electrode plates 9 and 10 in the electrolyte 7 via the control means 19. At this time, considering that the electrode plate at a relatively positive voltage being applied operates as an anode and the electrode plate at a relatively negative voltage being applied operates as a cathode, the electrolyte 7 is provided therein with anode and cathode chambers separated by the diaphragm 8. In the alkaline ionic water generation mode, the electrode plates 10 and 9 operate as the anode and the cathode, respectively. Contrastingly in the acid ionic water generation mode, the electrode plates 9 and 10 operate as the anode and the cathode, respectively.

After starting the supply of water, the control means 19 reads a signal from the flow rate sensor 5, and judges the state in which the level of the flow rate exceeds a fixed value, to be in operation of water supply. At this time, since an electrolysis condition has been set by pressing the generation mode selection button in the operation display section 20, the control means 19 outputs an operation command so as to apply a predetermined voltage to the electrode plates 9 and 10 for performing electrolysis in the electrolyte 7. In this manner, the electrode plates 9 and 10 operates as the cathode and the anode, respectively, in the alkaline ionic water generation mode, and alkaline ionic water is discharged through the discharge pipe 13. In the acid ionic water generation mode, the electrode plates 9 and 10 operates as the anode and the cathode, respectively, and acid ionic water is discharged through the discharge pipe 13.

When the supply of raw water is stopped with the water faucet 2, the control means 19 judges, on the basis of the output of the flow rate sensor 5, this state to be water stop. The control means 19 then stops, through its voltage application control section, voltage application to the electrode plates 9 and 10 in the electrolyte 7.

In the water purification mode, no voltage is applied to the electrode plates 9 and 10. The electromagnetic valve 21 is shut to stop discharging water. Purified water is discharged through the discharge pipe 13.

As the water purifying section 4 removes impurities such as remaining chlorine, trihalo methane, mustiness, and bacteria in raw water, meshes thereof get clogged gradually. This deteriorates electrolysis performance. The control means 19 reads signals from the flow rate sensor 5 and integrates the flowing water quantity. When the integration reaches a fixed value, the control means 19 makes the operation display section 20 display to indicate that the water purifying section 4 must be renewed. According to the quality of raw water, clogging may become critical before the integrated water quantity reaches the fixed value. In such a case, the control means 19 monitors variations of signals from the flow rate sensor 5, and makes the operation display section 20 display to indicate that the water purifying section 4 must be renewed. When the water purifying section 4 is detached and a new water purifying section 4 is attached, the control means 19 detects the presence/absence of the water purifying section 4 through the water purifying section detection sensor 16. The control means 19 thereby judges that a new water purifying section 4 has been attached, and initializes the integration of water quantity and the water flowing condition. Alternatively, a user can freely initialize the integration of water quantity and the water flowing condition by operating the operation display section 20.

In the alkaline ionic water generation mode or the acid ionic water generation mode, the control means 19 supplies a DC voltage generated in the power supply section 18, to the electrode plates 9 and 10 in the electrolyte 7. When a fixed DC voltage is supplied to the electrode plates 9 and 10, the current flowing between the electrode plates 9 and 10 varies in accordance with the quality of service water and the flow rate of service water passing through the water passage, and also the pH value generated varies accordingly.

When a user selects a desired pH intensity with the pH intensity button in the operation display section 20, the control means 19 changes the time for supplying the DC voltage generated in the power supply section 18, to the electrode plates 9 and 10, within a fixed period in accordance with the selected pH intensity, so as to generate alkaline ionic water or acid ionic water.

The control means 19 controls the switching section 25 for switching the electrolysis current detection sections (1) 23 and (2) 24, and monitors the current flowing between the electrode plates 9 and 10. The supply time is thereby controlled such that only a current not more than a fixed value flows.

The pH value to be generated can be controlled with the pH intensity button on the basis of measuring generated water discharged through the discharge pipe 13, with a pH reagent or the like.

FIG. 2 shows an electrolysis current detection section (1) conversion level 26, which is a conversion level of the electrolysis current detection section (1) 23, an electrolysis current detection section (2) conversion level 27, which is a conversion level of the electrolysis current detection section (2) 24, and a switching judgment level 28, which is a judgment level for switching.

FIG. 3 shows a schematic circuit diagram of the electrolysis current detection sections (1) 23 and (2) 24, and the switching section 25.

When alkaline ionic water or acid ionic water is generated in the alkaline ionic water conditioner of this embodiment comprising those components, the water faucet 2 is opened. Raw water supplied through the water faucet 2 passes through the water purifying section 4. The raw water from which impurities have been removed in the water purifying section 4, passes through the flow rate sensor 5. An integrated circuit 19a reads a signal from the flow rate sensor 5, and judges the state in which the level of the flow rate exceeds a fixed value, to be in operation of water supply. At this time, if the alkaline ionic water generation mode or the acid ionic water generation mode is selected with the operation display section 20, the integrated circuit 19a turns, through a relay drive circuit 19c, each contact of a relay 19b to which a drive voltage is supplied from the power supply section 18, onto one side of a drive coil. More specifically, in case of the alkaline ionic water generation mode, a contact 1 of the relay 19b is connected to the drain of an FET 19d and a contact 2 is connected to the power supply section 18 for supplying an electrolysis voltage, so that the electrode plates 10 and 9 operate as the anode and the cathode, respectively. Contrastingly in case of the acid ionic water generation mode, the contact 1 of the relay 19b is connected to the power supply section 18 and the contact 2 is connected to the drain of the FET 19d, so that the electrode plates 10 and 9 operate as the cathode and the anode, respectively. The source of the FET 19d is connected to a current detection element 19f, the other terminal of which is connected to the ground potential of the circuit. The integrated circuit 19a then makes the FET 19d in its ON state through an FET drive circuit 19e connected to the gate terminal for turning the FET 19d ON/OFF. At this time, in case of the alkaline ionic water generation mode, an electrolysis voltage is supplied from the power supply section 18 to the electrode plate 10 via the contact 2 of the relay 19b, and an electrolysis current flows from the electrode plate 10 to the electrode plate 9. The current further flows via the contact 1, the channel between the drain and the source of the FET 19d, and the current detection element 19f into the ground terminal of the circuit. In case of the acid ionic water generation mode, an electrolysis voltage is supplied from the power supply section 18 to the electrode plate 9 via the contact 1 of the relay 19b, and an electrolysis current flows from the electrode plate 9 to the electrode plate 10. The current further flows via the contact 2, the channel between the drain and the source of the FET 19d, and the current detection element 19f into the ground terminal of the circuit. In this manner, generation of alkaline ionic water or acid ionic water is started. The electrolysis current flowing between the electrode plates 9 and 10 is converted into a voltage by the current detection element 19f, and supplied to an input terminal of an operation amplifier OP1 of the electrolysis current detection section (1) 23 and an input terminal of an operation amplifier OP2 of the electrolysis current detection section (2) 24. The amplification factor of the operation amplifier OP1 can be set with resistance values R1 and R2. The amplification factor increases as the resistance value R1 increases, and decreases as the resistance value R1 decreases. Also, the amplification factor of the operation amplifier OP2 can be set with resistance values R3 and R4. The output terminals of the operation amplifiers OP1 and OP2 of the electrolysis current detection sections (1) 23 and (2) 24 are connected to a contact of the switching section 25. The integrated circuit 19a turns, through a relay drive circuit 19g, the contact of the switching section 25 to which a drive voltage is supplied from the power supply section 18, onto one side of a drive coil. The common terminal of contact of the switching section 25 is connected to an analogue input section of the integrated circuit 19a, and an output level of the electrolysis current detection section (1) 23 or (2) 24 can be detected by switching the switching section 25.

Levels of electrolysis current very widely range in accordance with the quality of raw water used. There may be a case that even one ampere is not allowed to flow, while several tens ampere may be let to flow, e.g., when brine is added for strongly accelerating generation. In this embodiment, the amplification factor of the operation amplifier OP1 of the electrolysis current detection section (1) 23 is set to DC 5 V at the electrolysis current of 1 A, and the amplification factor of the operation amplifier OP2 of the electrolysis current detection section (2) 24 is set to DC 5 V at the electrolysis current of 10 A. The output of each operation amplifier changes in proportion to electrolysis current.

In this electrolysis control, before starting generation, the integrated circuit 19a connects, through a relay drive circuit 19f, the contact 3 of the switching section 25 to the output of the operation amplifier OP1 of the electrolysis current detection section (1) 23. The analogue input section of the integrated circuit 19a connected to the common terminal of the contact of the switching section 25 is thereby set in a state possible to detect DC 5 V at the electrolysis current of 1 A. In case of the alkaline ionic water generation mode, the contact 1 of the relay 19b is connected to the drain of the FET 19d and the contact 2 is connected to the power supply section 18 for supplying an electrolysis voltage, so that the electrode plates 10 and 9 operate as the anode and the cathode, respectively. The integrated circuit 19a makes the FET 19d in its ON state for a fixed time within a fixed period through the FET drive circuit 19e connected to the gate terminal for turning the FET 19d ON/OFF. An electrolysis voltage is supplied from the power supply section 18 to the electrode plate 10 via the contact 2 of the relay 19b, and an electrolysis current flows from the electrode plate 10 to the electrode plate 9. The current further flows via the contact 1, the channel between the drain and the source of the FET 19d, and the current detection element 19f into the ground terminal of the circuit. The electrolysis current flowing between the electrode plates 9 and 10 is converted into a voltage by the current detection element 19f. The integrated circuit 19a detects, through its analogue input section, an output amplified by the operation amplifier OP1 of the electrolysis current detection section (1) 23. When the output level of the electrolysis current detection section (1) 23 exceeds the switching judgment level 28, i.e., it is a level possible to judge that an electrolysis current of 1 A or more flows, the integrated circuit 19a connects the contact 3 of the switching section 25 to the output of the operation amplifier OP2 of the electrolysis current detection section (2) 24, and further continues output level detection. When the output level of the electrolysis current detection section (1) 23 is below the switching judgment level 28, i.e., it is a level possible to judge that the electrolysis current is 1 A or less, the range of electrolysis current detection can be judged to be optimum, so the contact 3 of the switching section 25 is left connected to the output of the operation amplifier OP1 of the electrolysis current detection section (1) 23.

In case of raw water with a high electrical conductivity, or adding brine for strongly accelerating generation, the current flowing between the electrode plates 9 and 10 becomes great, and the output level of the electrolysis current detection section (1) 23 exceeds the switching judgment level 28. So, the control means 19 performs switching to the electrolysis current detection section (2) 24 through the switching section 25, and then starts generation.

In contrast with the above, in case of raw water with a very low conductivity, a current is hard to flow between the electrode plates 9 and 10. So, the control means 19 performs switching to the electrolysis current detection section (1) 23 through the switching section 25, and then starts generation.

Here, the principle of electrolysis will be described briefly. A pair of electrodes is disposed in water, and a diaphragm with microscopic holes allowing ionic substances in water to pass freely but not allowing liquid water itself to pass freely, is provided in between the electrodes. When one of the electrodes is connected to a positive pole and the other to a negative pole, the anode of the electrolyte attracts anions such as chloride ions while the cathode attracts cations such as magnesium ions and calcium ions. At this time, if a sufficient voltage is applied between both poles, electrolysis of water occurs. The anode generates oxygen gas, chlorine gas, or the like, and releases H ions into water, while the cathode generates hydrogen gas or the like and releases OH ions into water. As a result, water on the anode side is biased to the acid side in which anions such as chloride ions have relatively increased, while water on the cathode side is biased to the alkaline side in which cations such as magnesium ions and calcium ions have relatively increased. A basic principle of electrolysis ionic water is separately to take out these parts of water for use. The chemical reaction occurring on the surface of each electrode is as follows:

on the anode side;

$$2H_2O \rightarrow 4H+O_2+4e$$

$$2Cl \rightarrow Cl_2+2e$$

on the cathode side;

$$6H_2O+6e \rightarrow 6OH+3H_2.$$

As described above, by an electrolysis current detection section comprising a plurality of output means different in conversion level, the conversion level of the electrolysis current sensor can be controlled in accordance with the level of the current flowing in the electrolyte. That is, the conversion level can be lowered when the current is at a high level, and raised when the current is at a low level. This affords an electrolysis current detection range with a high resolution. For example, control in pH 9.5 or less at intervals of 0.5 in pH can be performed, and an optimum pH control can be performed.

When the electrolysis current detection section comprises output means as many as possible and the output means have differences in conversion level as small as possible, a more optimum electrolysis control can be performed.

The switching section is not limited to relays but may be a device such as an analogue switch for switching analogue signals. It may be constructed by a mechanical switch. Besides, if a plurality of analogue input sections is incorporated in the integrated circuit without such a switching section, a plurality of outputs of the electrolysis current detection section different in conversion level can be directly detected by the analogue input sections of the integrated circuit.

Figure 5:
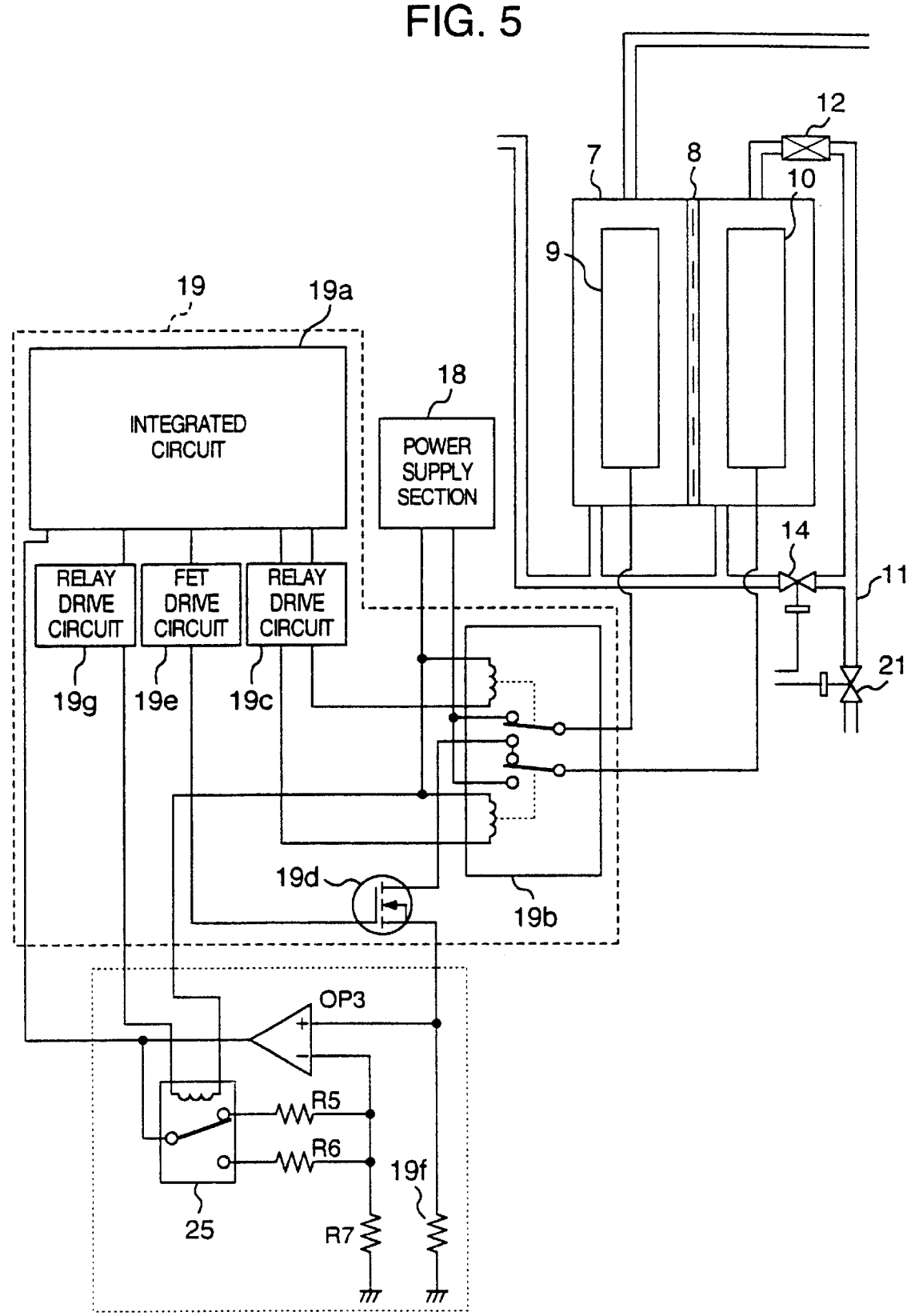
FIG. 5 is a schematic circuit diagram of an electrolysis current detection section in which the embodiment of FIG. 3 is modified.

FIG. 5 shows an example in which the embodiment of the electrolysis current detection section of FIG. 3 is modified. An electrolysis current flowing between the electrode plates 9 and 10 is converted into a voltage by the current detection element 19f, and supplied to an input terminal of an operation amplifier OP3 of the electrolysis current detection section. Resistances R5 and R6 are connected to the contact of the switching section 25. The integrated circuit 19a turns, through a relay drive circuit 19g, the contact of the switching section 25 to which a drive voltage is supplied from the power supply section 18, to one side of a drive coil. The common terminal of the switching section 25 is connected to an analogue input section of the integrated circuit 19a. The amplification factor of the operation amplifier OP3 can be changed by switching the switching section 25.

According to this form, a plurality of elements for determining an amplification factor of the electrolysis current detection section is provided without provision of a plurality of output means. By switching them by the switching section 25, a plurality of conversion levels can be provided by a single output means.

In this manner, according to the alkaline ionic water conditioner in the form using the electrolysis current detection section of FIG. 3 or 5, in any region where the electrical conductivity of raw water is high or low, or even in case of adding brine for strongly accelerating generation, an optimum electrolysis current detection range can be set by lowering the conversion level when an excess current flows, and raising the conversion level when a current is hard to flow, and pH generation can efficiently be controlled.

What is claimed is:

1. An alkaline ionic water conditioner in which raw water is electrolyte in an electrolyte to generate output water which is either one of alkaline ionic water and acid ionic water, said conditioner comprising control means for controlling an alkaline ionic water conditioner body containing said electrolyte, and an electrolysis current detection device for detecting a current flowing in said electrolyte, wherein said control means comprises means for performing pH control of said output water in accordance with a change in said electrolysis current due to a difference in quality of the raw water and said electrolysis current detection device comprises outputs having different conversion levels selectively employed in accordance with an amount of electrolysis current flowing in said electrolyte, to enable said electrolysis current to be detected with high resolution.

2. A conditioner according to claim 1, wherein said control means controls a judgment for switching among conversion levels of said electrolysis current detection device, in accordance with said amount of said electrolysis current flowing in said electrolyte.

3. A conditioner according to claim 1, wherein said conversion levels comprise at least a first conversion level and a second conversion level, said first conversion level being employed when said electrolysis current is less than or equal to a predetermined current, and wherein said control means controls said electrolysis current detection device to employ said second level when said electrolysis current is greater than or equal to said predetermined current.

4. An alkaline ionic water conditioner in which raw water is electrolyte in an electrolyte to generate output water which is either one of alkaline ionic water and acid ionic water, said conditioner comprising:

control means for controlling an alkaline ionic water conditioner body containing said electrolyte, an electrolysis current detection device for detecting a current flowing in said electrolyte, wherein said control means comprises means for performing pH control of said output water in accordance with a change in said electrolysis current due to a difference in quality of the raw water, and said electrolysis current detection device comprises outputs having different conversion levels selectively employed in accordance with an amount of electrolysis current flowing in said electrolyte, to enable said electrolysis current to be detected with high resolution, and a switching section for switching said conversion levels of said electrolysis current detection device.

5. A conditioner according to claim 4, wherein said control means controls a judgment for causing said switching section to switch among said conversion levels of said electrolysis current detection device, in accordance with said amount of said electrolysis current flowing in said electrolyte.

6. A conditioner according to claim 4, wherein said conversion levels comprise at least a first conversion level and a second conversion level, said first conversion level being employed when said electrolysis current is less than or equal to a predetermined current, and wherein said control means controls said switching section to switch said electrolysis current detection device to said second conversion level when said electrolysis current is greater than or equal to said predetermined current.

* * * * *